March 24, 1953  W. T. DUNN  2,632,541
CLUTCH CONSTRUCTION
Filed Oct. 29, 1947  2 SHEETS—SHEET 1
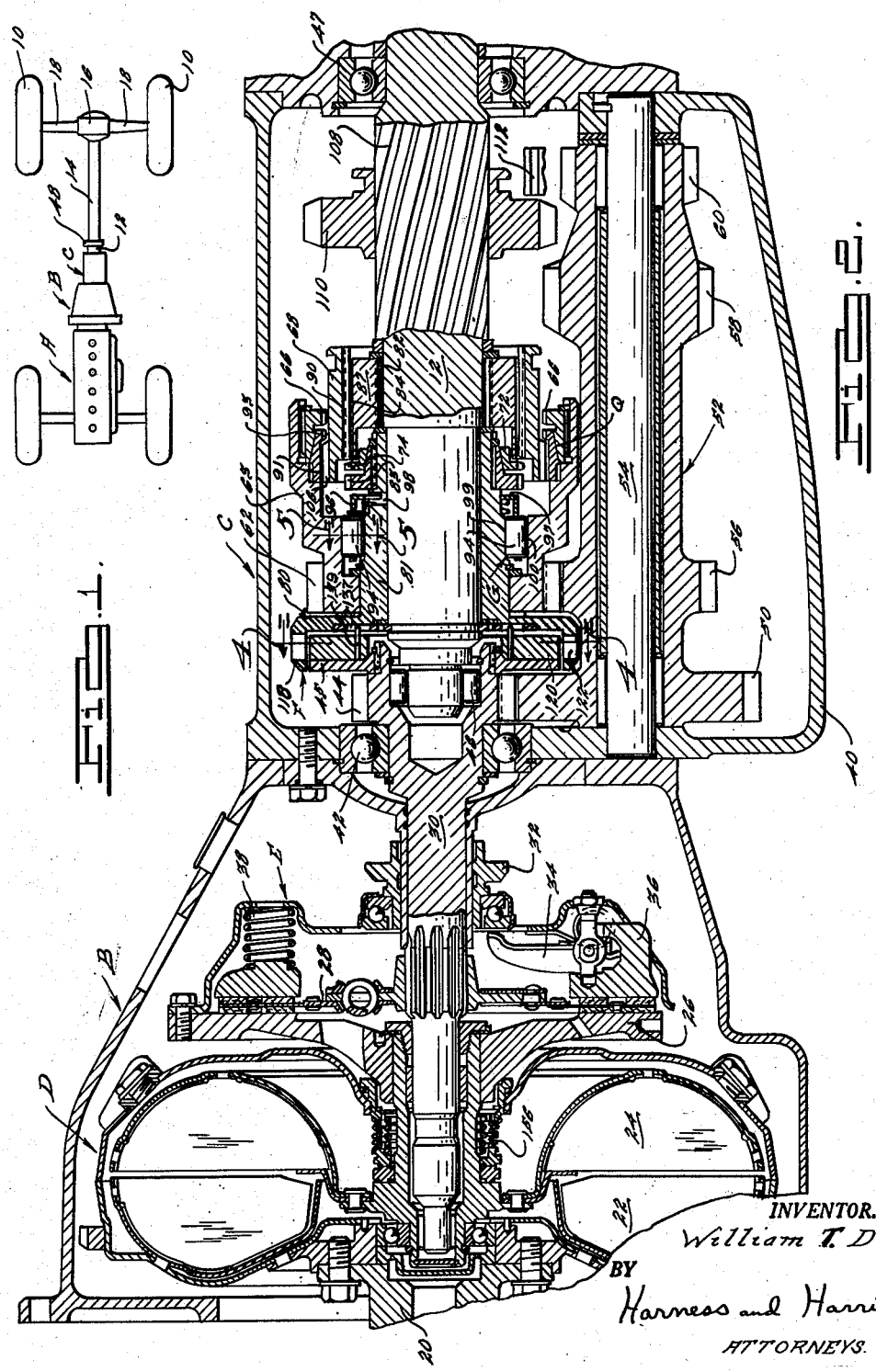
INVENTOR.
William T. Dunn
BY
Harness and Harris
ATTORNEYS.

March 24, 1953 W. T. DUNN 2,632,541
CLUTCH CONSTRUCTION
Filed Oct. 29, 1947 2 SHEETS—SHEET 2
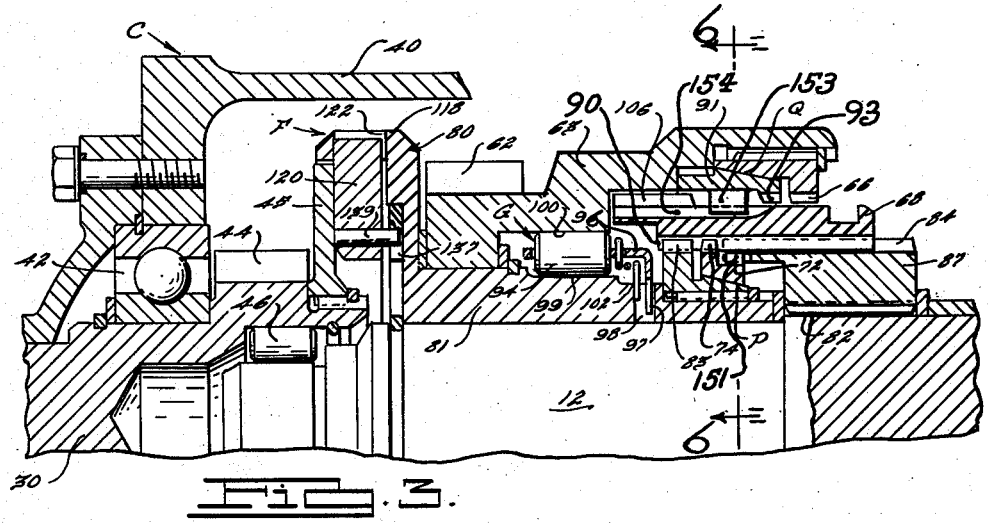
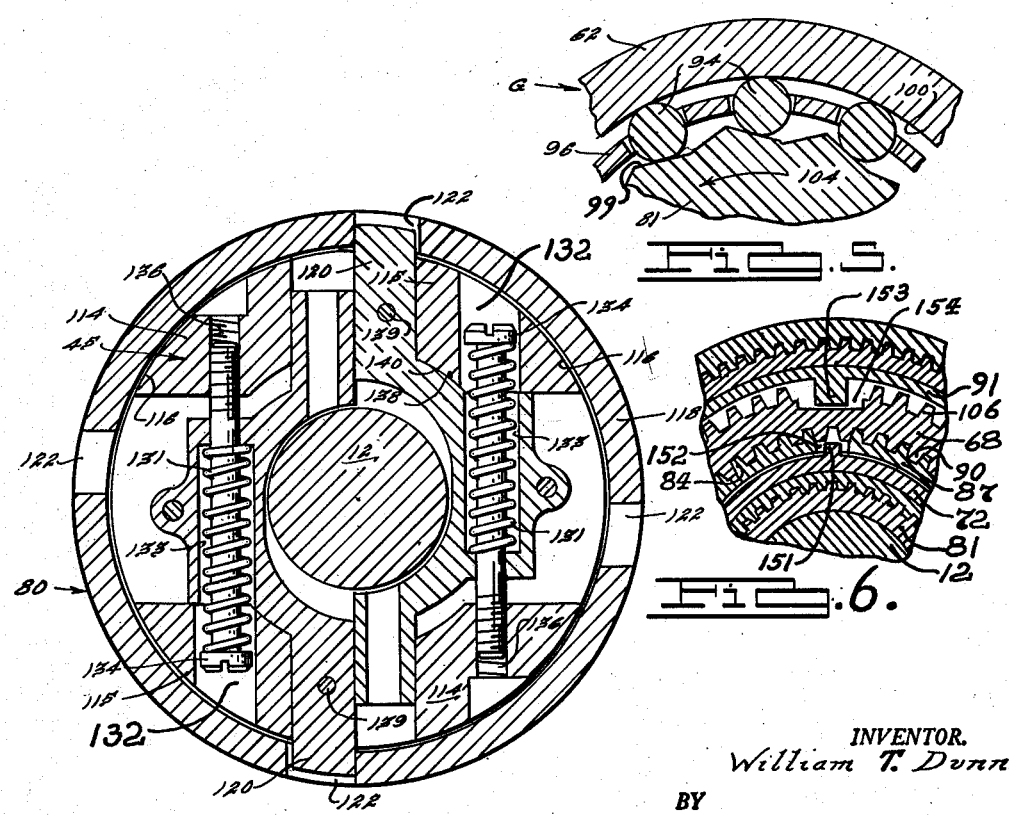
INVENTOR.
William T. Dunn.
BY
Harness and Harris
ATTORNEYS.

Patented Mar. 24, 1953

2,632,541

UNITED STATES PATENT OFFICE 2,632,541

CLUTCH CONSTRUCTION

William T. Dunn, Detroit, Mich., assignor to Chrysler Corporation, Highland Park, Mich., a corporation of Delaware Application October 29, 1947, Serial No. 782,785

9 Claims. (Cl. 192—48)

This invention relates to power transmission, and particularly to improvements in clutches for semi-automatic transmissions of the manually selective type which provide, for instance, three forward speeds and a reverse speed.

One of the disadvantages of transmissions of the aforesaid type is the requirement for de-clutching and making several selective gear changes in order to get into the cruising speed ratio drive from a starting gear ratio drive. To overcome this disadvantage, automatic shifting has been provided in some automatic type transmissions but such has been limited to the higher price lines due to transmissions of this type requiring expensive mechanical and electrical controls in order to accomplish the automatic changes in speed ratio drive. The present invention contemplates a simplified, low cost, mechanical arrangement, free of complicated controls, for the accomplishment of automatic speed ratio changes, such an arrangement being particularly adaptable for the relatively low priced automobiles. In its broad aspect the invention incorporates in a manually selective transmission a centrifugal force controlled clutch in combination with an overrunning clutch, these elements being arranged so that automatic changes in speed ratio drive between a starting gear ratio and a cruising direct drive ratio may be readily accomplished. When my novel construction is used in combination with a fluid coupling it is possible, under ordinary conditions of forward drive, to merely manually shift from a neutral position to a starting gear ratio and thereafter de-clutching is unnecessary as the upshifts and downshifts, to accomplish the required changes in speed ratio drive, take place automatically.

An object of the present invention is to provide an improved, inexpensive transmission incorporating a driver controlled, automatic, mechanical upshift between a starting second speed and direct drive high speed.

Another object of this invention is to provide a novel clutch construction for synchronously connecting a pair of driving and driven shafts for the transmission of different speed ratio drives.

A further object is to provide a transmission of the aforesaid type including a two-way drive in each speed ratio in addition to the freewheel second speed ratio provided to accomplish the automatic speed changes.

An additional object is to provide an improved, simplified transmission having a one-way freewheel, starting second speed drive, adapted to be automatically shifted into high speed direct drive, and also a two-way second speed drive operable for engine braking purposes, the transmission including novel means to obtain synchronized shifts between these two second speed drives.

Another object of the present invention is to provide an improved, inexpensive transmission of a simplified design which includes three two-way forward drives as well as a one-way starting second speed drive which automatically shifts, under driver control, into a direct, two-way, high speed or cruising drive.

A further object of this invention is to provide an improved, inexpensive, three speeds forward and reverse transmission having a novel clutch control comprising a centrifugal force operated clutch and a jaw clutch arranged for selective interconnection with a shift sleeve structure in which the shift from an automatic second starting speed to a positive, two-way drive second speed is accomplished by moving the shift sleeve through only a single set of gear teeth.

These and other objects and advantages of my invention will become apparent from the following description when taken in conjunction with the accompanying drawings wherein:

Fig. 1 is a diagrammatic showing of the power plant and drive mechanism of a vehicle incorporating the present invention;

Fig. 2 is a sectional elevational view through the speed ratio changing transmission of my invention, the gearing being shown in neutral position;

Fig. 3 is a detailed enlarged view of the automatic second speed-direct drive speed selector mechanism of my invention, the shift sleeve being shown in freewheel second speed position with the centrifugal clutch engaged to establish direct drive;

Fig. 4 is a sectional view taken along line 4—4 of Fig 2 showing the centrifugal pawl mechanism with the pawls engaged;

Fig. 5 is a sectional view taken along line 5—5 of Fig. 2 showing the free wheel clutch mechanism; and Fig. 6 is a fragmentary sectional view taken along line 6—6 of Fig. 3.

Referring now to the drawings wherein similar reference characters are used to designate corresponding parts of the structure in the several views, Fig. 1 illustrates a typical diagrammatic arrangement of a transmission mechanism in a vehicle embodying the present invention. The vehicle engine A is coupled to the driving wheels 10 of the vehicle through a fluid power transmitting and clutch unit B and a change speeding gearing C, shown in detail in Figs. 2–6 inclusive, and comprising a three speed forward and reverse transmission having an automatically operative direct drive ratio. As seen in Fig. 1, the transmission output or driven shaft 12 of the unit C is connected by means of the usual propeller shaft 14 with the customary differential gear box 16 which in turn drives the axle shafts 18.

As best seen in Fig. 2, I preferably arrange for transmitting drive from the engine A to the transmission C through clutch means B comprising a fluid coupling D of the kinetic type operating in conjunction with a manually releasable friction clutch E of conventional design which is primarily employed to facilitate manual shift in the transmission C. Due to the use of a fluid coupling it is possible to start from any selected gear ratio and accordingly, for ordinary forward drive, starting in either of the second speed gears is most advantageous.

The engine crankshaft 20 drives the coupling impeller 22 and the rotation of the impeller 22 causes fluid to circulate in the vaned passages of the fluid coupling D so as to drive the vaned runner 24 in the customary manner of operation for fluid couplings of the type illustrated. The runner 24 drives the clutch member 26 of the friction clutch E. Driven clutch member 28 is fixed to intermediate shaft 30 and is normally held in driving engagement with member 26. Member 28 is drivingly disengaged from driving member 26 by depressing a clutch pedal (not shown) which slides throw-out sleeve 32 forwardly to operate levers 34 so as to unload driving pressure plate 36. Springs 38 load this plate 36 and cause engagement of the clutch E when the clutch pedal is released.

Shaft 30 extends rearwardly into the housing or casing 40 of transmission C (Fig. 2) where it is rotatably supported by a ball bearing 42. The rearwardly extending end of shaft 30 is formed with a main drive pinion 44. Also formed on the rear end of the shaft 30 is an enlargement 45 constituting the pawl carrier of the centrifugal clutch F more clearly illustrated in Fig. 4 and subsequently described in detail. The drive pinion 44 is hollow and journals, by a bearing unit 46 (see Fig. 2), the forward end of the transmission driven shaft 12, the rear end of shaft 12 being journaled in bearing unit 47. Shaft 12 may also carry at its rear end a propeller shaft brake drum 48, having braking mechanism (not shown) associated therewith.

The drive pinion 44 continuously meshes with a gear 50 for driving the countershaft gear cluster 52. Cluster 52 is rotatably mounted on a countershaft 54 which is supported at its end portions in the casing 40. The cluster 52 includes a second or intermediate speed pinion 56, a first or low speed pinion 58 and a reverse pinion 60.

The second speed pinion 56 constantly meshes with an intermediate or second speed gear 62 journaled for rotation on the hub portion 81 of the shell member 80 of centrifugal pawl clutch F. Centrifugal clutch shell member 80 is rotatably mounted on driven shaft 12. The second speed gear 62 is substantially cup-shaped and has a rearwardly extending peripheral flange or side wall portion 63.

An overrunning or freewheel clutch, generally designated by the letter G (Figs. 3 and 5), is arranged intermediate the flange portion 63 of the gear member 62 and the hub portion 81 of the centrifugal clutch pawl shell 80. Clutch G provides a direct one-way driving connection between the gear 62 and the hub 81 of the shell member 80 of the pawl clutch F, being adapted to drivingly lock the gear 62 and the hub 81 together upon tendency of the gear 62 to rotate faster than the hub 81 in a forward direction while permitting overrun of the hub 81 relative to the gear 62. The clutch G is of the conventional overrunning type and is provided with rollers 94 and a cage or carrier 96 having tabs 97 receivable into slots 98 in the rear portion of the shell hub 81 so as to establish a permanent, one-way driving connection between the gear 62 and the pawl shell 80. The hub portion 81 is provided with cam faces 99 forming the inner race of the overrunning clutch device G and a portion of the peripheral flange 63 of gear 62 forms an outer shell 100 so as to surround the rollers 94 and provide a smooth runway therefor. A torsion spring 102 biases the rollers 94 in the direction of the arrow 104, see Fig. 5, into overrunning clutch lock-up position and lock-up occurs whenever the gear 62 tends to rotate forwardly, in the direction of the arrow 104, faster than the shell 80.

The rear end portion of hub 81 of shell 80 is provided with teeth 83 as well as a cone-shaped supporting surface P on which is rotatably mounted a conventional synchronizing and blocker element or ring 72. Ring 72 is connected to shaft hub 87 by means of conventional clocking lug and slot connections which permit a limited rotational or relative oscillatory movement between the hub 87 and the ring 72. Ring 72 carries lug elements 151 adapted to be positioned in slots 152 formed in the hub 87. This lug and slot connection between ring 72 and hub 87 is such as to position the blocker teeth 74 of the ring 72 in blocking relationship to the teeth 90 of the sleeve 68 when the latter rotatably lead or lag the shell teeth 83. The teeth 83 and 74 are pointed on their rear ends, as are the forward ends of sleeve teeth 90, engageable therewith, to facilitate the blocking and synchronizing action between the elements 68 and 80 and to facilitate shift of sleeve 68. Preferably the teeth 74, 83 and 90 are equally angled at each side.

Hub member 87 is splined to the shaft 12 at 82 and the shift sleeve 68 is slidably mounted on the shaft hub member 87. The hub 87 has external splines or teeth 84 to receive the mating internal teeth 90 of the shift sleeve 68, this construction permitting axial movement of the sleeve 68 relative to shaft 12. The teeth 90 of sleeve 68 are preferably of the same form as the blocker teeth 74 and the teeth 83 on the hub 81 of pawl shell 80 and are axially in line therewith. The clutch sleeve 68 is also provided with external teeth 106 which teeth are adapted to be engaged with the internal teeth 66 on the rear end of flange portion 63 of gear 62 when sleeve 68 is shifted rearwardly. Engagement of sleeve teeth 106 with the flange teeth 66 on gear 62 provides a two-way, intermediate or second speed drive through gear 62 to shaft 12. The portion of the internal surface of the gear flange 63, forward of the teeth 66, is formed with a cone-shaped supporting surface Q adapted to receive a synchronizing and blocker ring 91 having blocker teeth 93. Blocker ring 91 has inwardly projecting clocking lugs or pins 153 adapted to project into clocking slots 154 formed in the shift sleeve 68 (see Figs. 3 and 6). The pin and slot connections between sleeve member 68 and blocker member 91 permit limited relative rotation between these members and facilitate the blocking and synchronizing action when it is necessary to engage sleeve teeth 106 with gear teeth 66. The rearward ends of the external sleeve teeth 106 are pointed in a manner similar to the forward ends of internal sleeve teeth 90 and the forward ends of teeth 93 and 66 are also pointed to facilitate engagement between the teeth 106 of the sleeve 68 and the teeth 93 of the blocker 91 and the teeth 66 on the flange 63 of gear 62 when sleeve 68 is shifted rearwardly.

The shift sleeve 68 is adapted for forward shift from the neutral position shown in Fig. 2 to the one-way drive intermediate or second speed position wherein the sleeve teeth 90 are engaged with the pawl shell hub teeth 83 to thereby establish a freewheeling intermediate or second speed drive ratio between the input shaft 30 and the driven shaft 12 through the means consisting of elements 30, 44, 50, 56, 62, G, 81, 83, 90, 84, 87 and 12.

The sleeve 68 is also adapted for rearward shift from the neutral position, shown Fig. 2, to a two-way drive second or intermediate speed position so as to engage the sleeve teeth 106 with the internal teeth 66 on the flange 63 of gear 62 to thereby establish a non-freewheeling two-way intermediate speed drive through the means consisting of elements 30, 44, 50, 56, 62, 66, 106, 68, 90, 84, 87 and 12. When established in this two-way, non-freewheeling second speed, sleeve teeth 90 are disengaged from the pawl shell hub teeth 83 and this prevents drive by the gear 62 through the freewheel device G.

In the neutral position of the sleeve 68, see Fig. 2, the sleeve teeth 90 and 106 are disengaged from both the pawl shell hub teeth 83 and the second speed gear teeth 66. In shifting from neutral to either of the intermediate or second speed starting gear ratios it is merely necessary to move the shift sleeve 68 either forwardly or rearwardly to engage the teeth on sleeve 68 with either the hub teeth 83 or the gear teeth 66 respectively. If the sleeve 68 is engaged in either the freewheeling second speed or the two-way drive second speed, it is a simple matter to shift to the other second speed gear for it merely requires disengagement of the sleeve teeth through which the drive is being transmitted and engagement of a set of sleeve teeth with teeth on another element. To accomplish this change it is merely necessary to go through one set of gear teeth. In prior constructions of this type it frequently required going through two or more sets of gear teeth in shifting between an automatic freewheel second speed and a two-way drive second speed. Furthermore, it will be noted that synchronized shifting of the sleeve 68 between its two drive transmitting positions is readily accomplished due to the fact that overrunning clutch G causes the gear 62 and clutch shell 80 to normally be rotated forwardly at substantially the same speed therefore shift of the sleeve 68 to engage the teeth on either of these directly connected members is greatly facilitated.

The sleeve 68 is adapted to be shifted into the various positions by a shift yoke and rail mechanism (not shown) under control of the driver, suitable stops or detents being provided to properly locate the sleeve.

Rearwardly of the sleeve 68 the shaft 12 is provided with a spiral splined portion 108 on which is slidable a combination low or first speed and reverse gear 110, this member being shown in its neutral position in Fig. 2. This gear 110 may be shifted forwardly or rearwardly of its neutral position by suitable yoke and rail mechanism (not shown) under driver control. When shifted forwardly the gear 110 becomes engaged with the low speed or first speed pinion 58 to establish the low or first speed drive ratio between the shafts 30 and 12, the drive transmission being through elements 30, 44, 50, 58, 110, 108, and 12. When shifted rearwardly the gear 110 becomes engaged with an idler gear 112 that is constantly in mesh with the reverse pinion gear 60, thus establishing reverse drive between the shafts 30 and 12. It will be understood that when shifting the gear 110 the shift sleeve 68 is in neutral position.

Referring now to the elements of the clutch F which, by preference, is of the centrifugal pawl type, a form of which is best seen in Fig. 4. This clutch F comprises the pawl carrier 45 which is provided with pawl guides 114, 115 having arcuate faces 116 fitting within the overhanging shell portion 118 of the clutch shell member 80. Slidably secured to the portions 114, 115 are a pair of radially movable pawls 120 which are adapted for outward movement oppositely to one another to engage slots 122 provided in the overhanging portion 118 of the clutch shell member 80 to establish a two-way direct drive between the shafts 30 and 12. Four pawl receiving slots are provided 90 degrees apart. Each of the pawls 120 has a pair of side faces in sliding engagement with side faces of the pawl guide members 114, 115 as clearly shown in Fig. 4. The pawls are oppositely disposed relative to one another and the adjacent faces thereof slidably engage one another. In order to normally urge the pawls inwardly of the pawl cage formed by the guide members 114, 115, so as to prevent their engagement with the slots 122 below a predetermined speed of rotation of the pawl carrier 45, control or governor compression springs 131 extend through recesses 132 of the guide portions 115 into recesses 133 in the pawls 120. Each spring has a bolt 134 inserted through it and the threaded end of each bolt is anchored in a recess 136 provided in each of the pawl guides 114. Adjustment of the engaging speed of the pawls 120 may be made either by replacing the springs 131 with new springs of different force values or by means of adjustment of the bolts 134.

The slots 122 in the pawl shell 80 are arranged so that diametrically opposite slots will simultaneously register with the pawls 120 so as to receive the pawls under the conditions hereinafter described.

The pawls 120 tend to move outwardly to engage the slots 122 after the pawl carrier 45 reaches a speed of rotation sufficient to overcome the resistance of the springs 131. To prevent ratcheting between the pawls 120 and the slots 122, and to insure alignment of the pawls 120 with the pawl slots 122, when the pawls move outwardly to engage the slots, a balk ring 137 may be provided. The balk ring is of any conventional type, or similar to that shown in the application of Robert W. Wolfe, Serial No. 780,011, filed October 15, 1947, wherein the aligning slots in the balk ring are engaged by pins 139 carried by the pawls 120. When the pawls move outwardly into the slots 122, their movement is limited by engagement of the portions 138 of the pawls with the inner surfaces 140 of the guide portions 115 of the pawl carrier.

Operation

In describing the operation of this transmission let it be assumed that the shift sleeve 68 and the low-reverse gear 110 are both in neutral positions, the clutch E engaged and the engine idling at approximately 450 R. P. M. Under these conditions the impeller 22 of the fluid coupling D will rotate at engine speed. There will be very little slip in the fluid coupling at this time due to the drag of the coupling seal 156 between the impeller 22 and runner 24 and the light load imposed on the coupling by the clutch G, pawl carrier 45 and countershaft parts. Hence, the pawl carrier 45 will rotate at a speed slightly under engine speed which is not sufficiently high to cause centrifugal force to move the pawls 120 outwardly into the slots 122 of the pawl shell 80. Moreover, there will be no drive between the gear 62 and sleeve 68 since the internal teeth 68 of the gear 62 are disconnected from the external sleeve teeth 106 of the sleeve 68 so that the gear 62 rotates freely about the sleeve 68. Also, as the internal teeth 90 of sleeve 68 are disconnected from the teeth 83 on the hub portion 81 of the pawl shell 80, there is no drive transmitted from the gear 62 through the freewheel clutch G and hub teeth 83 to the sleeve 68.

In order to obtain forward movement of the car, the driver releases the clutch E so as to permit shifting into one of the two second speed starting gear ratios or into low gear.

If the driver desires to start in the automatic upshifting second speed gear ratio he shifts the clutch sleeve 68 forwardly to the position shown in Fig. 3 during which movement the sleeve teeth 90 become engaged with the teeth 83 of the pawl shell hub 81 so as to drivingly connect the hub 81 to the sleeve 68. Upon completion of this shifting movement the driver will engage the clutch E and depress the fuel accelerator to speed up the engine and the car will be driven forwardly in the freewheeling second speed ratio referred to above, through the gear train comprising shaft 30, pinion 44, gear 50, pinion 56, gear 62, freewheeling device "G," hub 81, teeth 83 and 90, sleeve 68, hub 87, and shaft 12. This is the starting drive ratio that permits an automatic upshift to direct drive under driver control. The car will be accelerated in this freewheel second speed ratio, with the various elements being speeded up as the engine speed is increased by further throttle opening movement of the accelerator. Manifestly, the pawl carrier 45 will rotate at a speed corresponding to that of the fluid coupling runner 24 and at some predetermined speed of these elements, for example, 650 to 750 R. P. M. substantially corresponding to a car speed in direct drive of about 13.6 to 16 M. P. H., the centrifugal force of the pawls 120 will overcome the resistance of the springs 131 and tend to move the pawls radially outwardly but their movement is restrained by the balk ring 137. The balk ring 137 will not permit the pawls to move outwardly under these conditions for the pawl carrier 45 is at this time rotating faster than the shell 118. This condition will continue so long as the runner 24 imposes torque on the shaft 30 that exceeds the load on the driven shaft 12. When the driver wishes direct drive speed ratio to be established he merely releases the accelerator to decelerate the engine and relieve the driving torque through the engaged teeth, whereupon, the runner 24 and pawl carrier 45 will slow down and when the rotative speeds of the carrier 45 and shell 80 cross each other, that is, become synchronized, the balk ring 137 will have aligned the pawls 120 with the slots 122 so that engagement of the pawls and slots then occurs, the parts being engaged as shown in Fig. 3. Upon depression of the accelerator to again speed up the engine, the transmission of torque will again be resumed and direct drive will have been established. Direct drive is transmitted through the train comprising a shaft 30, pawl carrier 45, pawls 120, shell 80, hub 81, teeth 83 and 90, sleeve 68, hub 87 and shaft 12. This is a two-way drive. It will be understood that in making engagement with the slots 122, the pawls 120 will be cushioned by the fluid coupling which will absorb any shock occurring in the engagement and will also reduce to a minimum, vibration and noise.

The pawl clutch F will remain engaged and the vehicle be driven in direct drive until the speed of the pawl carrier 45 falls below a predetermined R. P. M. for instance, between 500 to 625 R. P. M. corresponding to a vehicle speed of between 10.5 to 12.75 M. P. H. in direct drive whereupon the springs 131 will effect a release of the pawls 120 and hence a release of the direct drive. Upon release of the pawls direct drive through the shell 80 ceases and the freewheel unit G will simultaneously and automatically re-establish freewheel second speed drive through the transmission. It is to be noted that at the engine speed at which the pawls release or begin releasing a substantial no-slip condition prevails in the fluid coupling drive and hence very little drag torque is imposed upon the pawls 120 to prevent their disengagement. Moreover, the springs 131 are strong enough to overcome the coast torque impressed upon the pawls at slow vehicle speeds. In view of this automatic operation it is possible, for example, for the driver to slow down the vehicle in approaching a traffic signal and to obtain an automatic downshift from direct drive to the freewheel second drive ratio in the process, all without releasing the clutch E. While standing at the traffic signal, the driver may allow the transmission to remain in freewheel second drive ratio without any creep of the vehicle occurring inasmuch as at this time the engine idle speed is preferably insufficient to develop torque enough to overcome the drag load of the vehicle on the runner of the fluid coupling. When the traffic signal changes, the driver need merely depress the accelerator pedal to accelerate the engine and the vehicle will again move forward in freewheel second drive ratio after which an automatic upshift, under driver control, may be accomplished when the necessary vehicle speed is attained.

It is sometimes desirable, for instance, when coasting down a hill in direct drive or freewheel second, to obtain engine braking. This may be effected by the driver releasing the clutch E and shifting the clutch sleeve 68 rearwardly to disengage sleeve teeth 90 and hub teeth 83 and engage the sleeve teeth 106 with the gear teeth 68 after passing through blocker teeth 93. Engagement of teeth 106 with teeth 66 and engagement of clutch E establishing a two-way second speed drive from the engine to the shaft 12 through shaft 30, pinion 44, gear 50, pinion 56, gear 62, teeth 66 and 106, sleeve 68 and hub 87. This is an overspeed drive to the engine. In making this downshift, if the pawls 120 are engaged in direct drive, the release of clutch E relieves the driving torque between the pawls 120 and the shell slots 122 and the pawls 120 are then free to be retracted by the springs 131 prior to completion of the rearward shift of sleeve 68. Release of clutch E also reduces the speed of rotation of the pawl carrier 45 so that ordinarily there is insufficient centrifugal force to urge the pawls outwardly against the retractive force exerted by the springs 131. Under these conditions when the main clutch E is again engaged engine braking will be obtained through the second speed two-way drive gear train comprising elements 12, 87, 68, 106, 66, 62, 56, 50. Should the pawls 120 not disengage during the rearward shift of sleeve 68 the result will still be the same since the pinion 44 will be driven by the gear 62 in overspeed and consequently the clutch shell 80 which carries the inner race 99 of the freewheel device G will overrun with respect to the gear 62.

Shift from two-way second speed drive to freewheeling second speed drive is obtained by declutching the clutch E to relieve the driving torque between the engaged teeth 66 and 106 after which a forward shift of the sleeve 68 will disengage these teeth and engage the sleeve teeth 90 with the hub teeth 83 after going through the blocker teeth 74. Engagement of teeth 83 and 90 establishes the freewheel second or intermediate speed drive from the gear 62 through the freewheel clutch G to the hub 81, the sleeve 68, hub 87 and shaft 12. The shifts between the two second speed drives may be easily accomplished, due to the fact that clutch shell 80 and gear 62 are drivingly connected by clutch G so that they normally rotate at the same speed.

If high torque multiplication is desired, for starting under adverse conditions, the shift sleeve 68, is left in neutral position and the low speed gear 110 is shifted forwardly to engage the low speed pinion 58. Thereafter upon depression of the accelerator the vehicle will be driven through the shaft 30, pinion 44, gear 50, pinion 58, gear 110 and shaft 12 in the low speed ratio.

Reverse drive is made available by shifting the combination low speed and reverse gear 110 rearwardly to engage the idler gear 112 to thereby establish reverse drive through the shaft 30, pinion 44, gear 50, pinion 60, idler gear 112, gear 110, and shaft 12.

It will be understood that adequate means are provided for locking the shift sleeve 68 in neutral when making any shift of the gear 110 and conversely the gear 110 is locked in a neutral position when shift is made of the sleeve 68.

From the above description it will be seen that I have provided a novel clutch construction for a transmission having an automatic speed-controlled upshift and downshift between a starting speed and a direct drive cruising speed which transmission is relatively simple in construction and operation and capable of economical production. It will be understood that although the particular arrangement disclosed herein is well adapted for carrying out the objects of my invention, various modifications, changes and substitutions may be made without departing from the spirit thereof. The present invention is, therefore, to be construed to include all such modifications, changes, and substitutions as may come within the scope of my invention as set forth in the appended claims.

I claim:

1. In a clutch control for synchronously connecting driving and driven shafts, a first clutch structure fixed to and adapted to be driven from one of the shafts, a second clutch structure journaled on the other shaft, relatively movable elements carried by one of said clutch structures to effect positive clutching engagement therebetween, a gear journaled on said other shaft, means adapted to drive said gear, a one-way drive, roller clutch directly drivingly connecting said gear and said second clutch structure comprising a pair of concentrically arranged clutching members respectively fixed to said gear and said second clutch member and clutch rollers mounted between said clutching members, adapted to transmit drive in one direction between said gear and said second clutch member, and a shift sleeve drivingly mounted on said other shaft and adapted to be drivingly engaged with said second clutch member when shifted to one axial position and to be drivingly engaged with said gear when shifted to a second axial position, the shifting of said sleeve between the several specified axial positions being synchronously accomplished due to the simultaneous rotation of the gear and the second clutch member.

2. In a clutch control for synchronously connecting driving and driven shafts, a first centrifugal clutch member drivingly connected to one of said shafts, a second centrifugal clutch member journaled on the other of said shafts and adapted to be drivingly engaged with said first centrifugal clutch member after one of said shafts has attained a predetermined speed of rotation, said second centrifugal clutch member having an axially extending hub portion provided with peripheral cam surfaces, a gear journaled on and having axially projecting portions extending concentrically about the hub portion of said second centrifugal clutch member, rollers mounted between the cam surfaces on the hub portion of the second centrifugal clutch member and a concentrically arranged axially extending flange portion of said gear to provide a one-way drive connection between said gear and said second centrifugal clutch member, means arranged to rotatably drive said gear, and a sleeve clutch member drivingly mounted on the other of said shafts and shiftable axially thereof, said sleeve clutch member having portions adapted to be drivingly engaged with said second centrifugal clutch hub portion when shifted to one axial position and portions adapted to be drivingly engaged with the gear member when shifted to a second axial position, the simultaneous rotation of the gear and second centrifugal clutch member due to the one-way drive connection therebetween providing means for obtaining synchronous shifting of said sleeve clutch member.

3. A clutch construction adapted to drivingly connect a pair of rotatable driving and driven members for the transmission of a plurality of different drives comprising a first, automatically operable, clutch device having a first clutch member drivingly mounted on one of said driving and driven members and a second clutch member, that is adapted to be drivingly engaged with said first clutch member, journalled on the other of said driving and driven members, said first and second clutch members including drive means adapted to be actuated in response to a predetermined speed of one of said driving and driven members, a second, manually operable clutch device drivingly mounted on the other of said driving and driven members, said second clutch device including a shift sleeve having drive transmitting means adapted to be drivingly engaged with drive transmitting means on said second clutch member, a gear journalled on said second clutch member of said first clutch device having drive transmitting means adapted to be drivingly engaged with the drive transmitting means on said second clutch device, a one-way, overrunning, drive transmitting mechanism permanently extending between said gear and said second clutch member of said first clutch device and arranged to produce simultaneous rotation of said gear and said second clutch member in one direction when said sleeve is engaged with either said gear or said second clutch member, said one-way drive transmitting means being arranged to permit said second clutch member of said first clutch device to overrun said gear in said one direction of rotation, manually operable control means for selectively engaging the drive transmitting means of said second clutch device with the second clutch member of the first clutch device and with said gear, and drive transmitting means connected between said driving member and said gear.

4. A clutch construction adapted to drivingly connect a pair of rotatable, driving and driven members for the transmission of a plurality of different drives comprising a first, automatically operable, clutch device having a first clutch member drivingly mounted on said driving member and a second clutch member, that is adapted to be drivingly engaged with said first clutch member, journalled on said driven member, said first and second clutch members having cooperating drive transmitting means that are automatically energized for the transmission of drive in response to the speed of one of said driving and driven members, a second manually operable, clutch device including a toothed shift sleeve drivingly mounted on said driven member, said second clutch member having toothed shift sleeve engageable means adapted to be drivingly engaged with teeth of shift sleeve of said second clutch device, a gear journalled on said driven member having toothed shift sleeve engageable means adapted to be drivingly engaged with teeth of the shift sleeve of said second clutch device, a one-way drive transmitting mechanism permanently extending between said gear and said second clutch member of said first clutch device insuring simultaneous rotation of the gear and said second clutch member in one direction in both of the engaged positions of the shift sleeve, said one-way drive transmitting mechanism being arranged to permit said second clutch member of said first clutch device to overrun said gear in said one direction of rotation, and manually operable control means for selectively drivingly engaging the shift sleeve of said second clutch device with the second clutch member of the first clutch device and with said gear.

5. A clutch construction adapted to drivingly connect a pair of axially aligned, rotatable, driving and driven shafts for the transmission of a plurality of different drives comprising a first, shaft speed responsive, automatically operable, clutch device having a first clutch member drivingly mounted on said driving shaft and a second clutch member, that is adapted to be drivingly engageable with said first clutch member at a predetermined shaft speed, journalled on said driven shaft, a second, manually operable clutch device drivingly mounted on said driven shaft, said second clutch device including an axially shiftable, toothed, drive transmitting sleeve, said second clutch member of said first clutch device having clutch teeth adapted to be drivingly engaged with the toothed sleeve of said second clutch device, a gear journalled on said driven shaft having clutch teeth adapted to be drivingly engaged with the toothed sleeve of said second clutch device, speed synchronizing blocker rings drivingly connected to said second clutch device and interposed between said shiftable sleeve and both the clutch teeth on said second clutch member and the clutch teeth on said gear, an overrunning clutch permanently extending between said gear and said second clutch member of said first clutch device and arranged to produce simultaneous rotation of said gear and said second clutch member in one direction when said sleeve is engaged with either said second clutch member or said gear, said overrunning clutch being arranged to permit said second clutch member of said first clutch device to overrun said gear in said one direction of rotation, manually operable control means for selectively engaging said second clutch of the first clutch device and with said gear, and driving means connected to said driving shaft and to said gear.

6. A clutch construction adapted to drivingly connect a pair of rotatable, driving and driven members for the transmission of a plurality of different drives comprising a first, centrifugal force actuated, pawl-type, automatically operable, clutch device having a pawl carrying first clutch member drivingly mounted on said driving member and a pawl receiving second clutch member journalled on said driven member; a second, manually operable clutch device drivingly mounted on said driven member, said second clutch device including an axially shiftable, toothed shift sleeve, said pawl receiving second clutch member including a hub portion with clutch teeth adapted to be drivingly engaged with the teeth of the shift sleeve of said second clutch device, a gear journalled on said driven member having an axially extending flange portion including clutch teeth adapted to be drivingly engaged with the teeth of the shift sleeve of said second clutch device, speed synchronizing blocker rings drivingly connected to said second clutch device and interposed between said shiftable sleeve and both the clutch teeth on said second clutch member and the clutch teeth on said gear, an overrunning clutch device permanently extending between said gear flange and the hub of second clutch member of said first clutch device adapted to cause continuous and simultaneous rotation of said gear and said second clutch member in one direction when said shift sleeve is engaged with either said gear or said second clutch member; said overrunning clutch device being arranged to permit said second clutch member of said first clutch device to overrun said gear in said one direction of rotation, and manually operable control means for selectively engaging said shift sleeve of the second clutch device with the second clutch member of the first clutch device and with said gear.

7. A clutch construction adapted to drivingly connect a pair of axially aligned, rotatable, driving and driven members comprising a first centrifugal clutch member, including a radially movable pawl, drivingly connected to said driving member, a second centrifugal clutch member, including a pawl receiving slot, rotatably mounted on said driven member by means of a hub portion, clutch teeth carried by said hub portion, said second centrifugal clutch member being adapted to be engaged with said first centrifugal clutch member after said driving member attains a predetermined speed of rotation, a gear journalled on the hub portion of said second centrifugal clutch member, said gear having an axially extending flange portion with clutch teeth thereon, an overrunning clutch positioned between said gear flange portion and the hub of said second centrifugal clutch member arranged to continuously drivingly connect said gear with said second centrifugal clutch member for simultaneous rotation in one direction while permitting said second clutch member to overrun said gear in said one direction, and a shift sleeve drivingly mounted on said driven member and shiftable axially thereof, said sleeve having teeth thereon adapted to be engaged with the clutch teeth on the flange of said gear when said sleeve is shifted to one axial position, and also having teeth thereon adapted to be engaged with the clutch teeth on the hub of said second centrifugal clutch member, when said sleeve is shifted to a different axial position, said overrunning clutch being arranged such that said gear and second centrifugal clutch member are simultaneously and continuously rotatable by said driving member when said shift sleeve is in either of said aforementioned axial positions.

8. A clutch construction adapted to drivingly connect a pair of axially aligned, rotatable, driving and driven members comprising a first centrifugal clutch member, including a radially movable pawl, drivingly connected to said driving member, a second centrifugal clutch member, including a pawl receiving slot, rotatably mounted on said driven member by means of a hub portion, clutch teeth carried by said hub portion, said second centrifugal clutch member being adapted to be engaged with said first centrifugal clutch member after said driving member attains a predetermined speed of rotation, a gear journalled on said driven member, said gear having an axially extending flange portion with clutch teeth thereon, an overrunning clutch positioned between said gear flange portion and the hub of said second centrifugal clutch member arranged to continuously drivingly connect said gear with said second centrifugal clutch member for simultaneous rotation in one direction while permitting said second clutch member to overrun said gear in said one direction, and a shift sleeve drivingly mounted on said driven member and shiftable axially thereof, said sleeve having teeth thereon adapted to be engaged with the clutch teeth on the flange of said gear when said sleeve is shifted to one axial position, and also having teeth thereon adapted to be engaged with the clutch teeth on the hub of said second centrifugal clutch member, when said sleeve is shifted to a different axial position, and toothed, speed synchronizing blocker rings drivingly connected to said driven member and interposed between said shift sleeve and the clutch teeth on said second clutch member and the clutch teeth on said gear flange portion, said overrunning clutch being arranged such that said gear and second centrifugal clutch member are simultaneously and continuously rotatable by said driving member when said shift sleeve is in either of said aforementioned axial positions.

9. A clutch construction adapted to drivingly connect a pair of rotatable driving and driven members comprising a first clutch device including a first clutch member drivingly connected to said driving member and a second clutch member, having centrifugal force actuated drive transmitting means drivingly engageable with said first clutch member, said second clutch member being journalled on said driven member, said second clutch member having an axially extending hub portion formed with a set of radially disposed clutch teeth and a blocker ring supporting surface adjacent thereto, a gear element journalled on the hub portion of said second clutch member, said gear element having an axially extending flange portion extending concentrically about a part of the hub portion of said second clutch member, the gear element flange portion including a set of radially disposed clutch teeth and a blocker ring supporting surface adjacent thereto, a one-way clutch drivingly connected between the concentrically arranged gear flange and hub portion of the second clutch member, a second clutch device drivingly connected to said driven member including an axially shiftable, toothed, sleeve adapted to be selectively engaged with the clutch teeth on the second clutch member of the first clutch device and with the clutch teeth on the gear element, and speed synchronizing toothed, blocker ring elements drivingly connected to said driven member through said second clutch device, said blocker ring elements being mounted on said blocker ring supporting surfaces and interposed between said shift sleeve and each of said sets of radially disposed clutch teeth, said one-way clutch providing for simultaneous and continuous rotation of the gear and the second clutch member when the toothed sleeve is engaged with either of the said sets of radially disposed clutch teeth.

WILLIAM T. DUNN.

REFERENCES CITED

The following references are of record in the file of this patent:

UNITED STATES PATENTS

| Number | Name | Date |
|---|---|---|
| 2,134,316 | Rauen | Oct. 25, 1938 |
| 2,170,926 | Keller | Aug. 29, 1939 |
| 2,212,731 | Dunn | Aug. 27, 1940 |
| 2,343,312 | Maurer | Mar. 7, 1944 |
| 2,380,559 | Tyken | July 31, 1945 |
| 2,383,149 | Neracher | Aug. 21, 1945 |
| 2,438,381 | Banker | Mar. 23, 1948 |